US011862203B2

(12) United States Patent
Horn

(10) Patent No.: US 11,862,203 B2
(45) Date of Patent: Jan. 2, 2024

(54) DISK CARTRIDGE DATA STORAGE LIBRARY

(71) Applicant: Western Digital Technologies, Inc., San Jose, CA (US)

(72) Inventor: Robert L. Horn, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/095,483

(22) Filed: Jan. 10, 2023

(65) Prior Publication Data
US 2023/0238036 A1 Jul. 27, 2023

Related U.S. Application Data

(60) Provisional application No. 63/302,063, filed on Jan. 22, 2022.

(51) Int. Cl.
*G11B 33/04* (2006.01)
*G11B 33/02* (2006.01)
*G11B 15/68* (2006.01)

(52) U.S. Cl.
CPC ...... *G11B 33/0483* (2013.01); *G11B 15/6825* (2013.01); *G11B 15/6835* (2013.01); *G11B 33/027* (2013.01)

(58) Field of Classification Search
None
See application file for complete search history.

(56) References Cited

U.S. PATENT DOCUMENTS 3,359,549 A 12/1967 Farrand et al.
4,008,492 A 2/1977 Elsing
(Continued)

FOREIGN PATENT DOCUMENTS

CN 102376331 A * 3/2012 ........... G11B 17/225
JP H08339675 A 12/1996
(Continued)

OTHER PUBLICATIONS

Sony Electronics Inc., Meet the family, 2 pages, downloaded from https://pro.sony/ue_US/products/optical-disc, as early as Aug. 5, 2021.
(Continued)

*Primary Examiner* — William J Klimowicz
(74) *Attorney, Agent, or Firm* — John D. Henkhaus

(57) ABSTRACT

A data storage disk cartridge library includes a media drive having a clean internal environment, a disk cartridge bay positioned adjacent to the media drive, and a disk cartridge positioned in the disk cartridge bay and having clean compartments for housing a clean disk trays supporting clean magnetic recording disk media. The media drive has a disk tray extractor including a seal plate positioned at times flush with a surrounding shroud, and a set of pins for extending through the seal plate and a disk tray and for moving to a tray locking position. The seal plate covers a disk tray faceplate to physically isolate the faceplate from the clean portion of the disk tray, the corresponding clean compartment, and the clean environment of the media drive. The shroud is configured to cover surfaces of the disk cartridge adjacent to the faceplate.

9 Claims, 11 Drawing Sheets

(56) References Cited

U.S. PATENT DOCUMENTS

| | | | |
|---|---|---|---|
| 4,396,964 A | 8/1983 | Morehouse et al. | |
| 4,412,261 A | 10/1983 | Tateyama et al. | |
| 4,607,301 A | 8/1986 | Iizuka | |
| 5,426,628 A | 6/1995 | Ishii | |
| 5,481,420 A | 1/1996 | Cardona et al. | |
| 5,548,521 A | 8/1996 | Krayer et al. | |
| 5,729,464 A * | 3/1998 | Dimitri | G11B 17/225 |
| 5,757,761 A * | 5/1998 | Menke | G11B 17/225 |
| 5,793,714 A * | 8/1998 | Inoue | G11B 17/221 |
| 5,818,723 A * | 10/1998 | Dimitri | G11B 17/223 360/99.06 |
| 5,880,904 A | 3/1999 | Mizoshita et al. | |
| 5,893,699 A | 4/1999 | Dadiomov | |
| 5,940,355 A * | 8/1999 | Buckland | G11B 17/225 369/30.55 |
| 6,005,744 A * | 12/1999 | Terashima | G11B 17/225 360/92.1 |
| 6,151,190 A | 11/2000 | Yamamoto et al. | |
| 6,301,204 B1 | 10/2001 | Yamada et al. | |
| 6,370,444 B1 * | 4/2002 | Kusunoki | G11B 17/225 700/214 |
| 6,671,575 B2 | 12/2003 | Baik | |
| 6,831,810 B1 | 12/2004 | Butler et al. | |
| 6,900,961 B1 | 5/2005 | Butler | |
| 7,062,837 B1 | 6/2006 | Butler | |
| 7,299,479 B2 | 11/2007 | Lin | |
| 7,383,560 B2 | 6/2008 | Edwards | |
| 7,508,621 B2 | 3/2009 | Pollard et al. | |
| 7,916,423 B2 | 3/2011 | Starr et al. | |
| 8,041,449 B2 | 10/2011 | Noble et al. | |
| 8,958,173 B1 | 2/2015 | Hirano et al. | |
| 9,063,542 B2 | 6/2015 | Greco et al. | |
| 9,147,436 B2 | 9/2015 | Watson et al. | |
| 9,601,149 B1 | 3/2017 | Todd et al. | |
| 9,607,662 B1 | 3/2017 | Adrian | |
| 9,715,894 B2 | 7/2017 | Ostwald et al. | |
| 9,916,869 B1 | 3/2018 | Gavillan et al. | |
| 10,217,491 B2 | 2/2019 | Goodman et al. | |
| 10,600,441 B1 | 3/2020 | Altknecht et al. | |
| 10,770,108 B2 | 9/2020 | Goto et al. | |
| 10,818,318 B2 | 10/2020 | Herdendorf et al. | |
| 11,443,775 B1 | 9/2022 | Herdendort et al. | |
| 2001/0055267 A1 * | 12/2001 | Shimizu | G11B 17/30 369/195 |
| 2002/0055804 A1 | 5/2002 | Betawar et al. | |
| 2002/0159182 A1 | 10/2002 | Albrecht et al. | |
| 2003/0011928 A1 | 1/2003 | Yanase | |
| 2003/0161070 A1 | 8/2003 | Bonin | |
| 2004/0049313 A1 | 3/2004 | Deckers | |
| 2005/0007898 A1 * | 1/2005 | Maeda | G11B 17/30 |
| 2005/0138652 A1 | 6/2005 | Liao et al. | |
| 2006/0132964 A1 | 6/2006 | Lau et al. | |
| 2006/0146658 A1 | 7/2006 | Russ | |
| 2006/0215322 A1 | 9/2006 | Oishi | |
| 2007/0127323 A1 * | 6/2007 | Owens | G11B 17/225 |
| 2007/0183084 A1 | 8/2007 | Coufal et al. | |
| 2007/0201164 A1 | 8/2007 | Bauck et al. | |
| 2009/0092345 A1 | 4/2009 | Hendriks et al. | |
| 2009/0297328 A1 | 12/2009 | Slocum, III | |
| 2010/0241271 A1 | 9/2010 | Shimizu et al. | |
| 2010/0287576 A1 | 11/2010 | Terzis et al. | |
| 2011/0064546 A1 | 3/2011 | Merrow | |
| 2011/0236163 A1 | 9/2011 | Smith et al. | |
| 2012/0039001 A1 * | 2/2012 | Sato | G11B 17/225 360/101 |
| 2014/0193226 A1 | 7/2014 | Hashimoto | |
| 2014/0271064 A1 | 9/2014 | Merrow et al. | |
| 2015/0103433 A1 | 4/2015 | Hirano | |
| 2017/0084304 A1 | 3/2017 | Fiebrich-Kandler | |
| 2017/0181306 A1 | 6/2017 | Shaw et al. | |
| 2018/0211691 A1 | 7/2018 | Altknecht et al. | |
| 2020/0119314 A1 | 4/2020 | Pun et al. | |
| 2020/0219537 A1 | 7/2020 | Kubo et al. | |

FOREIGN PATENT DOCUMENTS

| | | | | |
|---|---|---|---|---|
| JP | 09139007 A | * | 5/1997 | G11B 17/0404 |
| JP | 2001344871 A | * | 12/2001 | G11B 17/30 |
| JP | 2003051149 A | * | 2/2003 | G11B 17/0404 |
| NL | 7908338 A | | 6/1981 | |
| WO | WO-9934364 A1 | * | 7/1999 | G11B 17/056 |

OTHER PUBLICATIONS

Sony Electronics Inc., PetaSite Scalable Solutions, 5 pages, downloaded from https://pro.sony/ue_US/products/optical-disc/petasite-solutions, as early as Aug. 5, 2021.

Korean Intellectual Property Office (ISA/KR), PCT International Search Report and Written Opinion for International application No. PCT/US2022/027549, dated Oct. 21, 2022, 10 pages.

Korean Intellectual Property Office (ISA/KR), PCT International Search Report and Written Opinion for International application No. PCT/US2022/027964, dated Sep. 27, 2022, 9 pages.

Hirano, Toshiki, Archival Data Storage Library, U.S. Appl. No. 17/402,370, filed Aug. 13, 2021.

Hirano, Toshiki, Read-Write Device For An Archival Data Storage Library, U.S. Appl. No. 17/405,991, filed Aug. 18, 2021.

\* cited by examiner

702 — A MEDIA DRIVE HAVING A CLEAN INTERNAL ENVIRONMENT EXTENDS A SET OF LOCKING PINS THROUGH A DIRTY FACEPLATE OF AN INTERNALLY-CLEAN DISK TRAY HOUSED IN AN EXTERNALLY-DIRTY DISK CARTRIDGE AND SUPPORTING A CLEAN MAGNETIC RECORDING DISK MEDIUM, INCLUDING COVERING THE DIRTY FACEPLATE WITH A SEAL PLATE, THROUGH WHICH THE SET OF LOCKING PINS EXTEND, TO PHYSICALLY ISOLATE THE DIRTY FACEPLATE FROM THE CLEAN INTERNAL PORTION OF THE DISK TRAY AND THE CLEAN INTERNAL ENVIRONMENT OF THE MEDIA DRIVE

704 — THE MEDIA DRIVE MOVES THE SET OF LOCKING PINS TO UNLOCK THE DISK TRAY FROM THE DISK CARTRIDGE AND TO HOLD THE DISK TRAY

706 — THE MEDIA DRIVE PULLS THE DISK TRAY WITH THE DISK MEDIUM FROM THE DISK CARTRIDGE COMPLETELY INTO THE CLEAN INTERNAL ENVIRONMENT OF THE MEDIA DRIVE THROUGH A SHROUD COVERING DISK CARTRIDGE SURFACES AROUND THE DIRTY FACEPLATE

FIG. 7

DISK CARTRIDGE DATA STORAGE LIBRARY

CROSS-REFERENCE TO RELATED APPLICATIONS

This application claims the benefit of priority to commonly-owned U.S. Provisional Patent Application No. 63/302,063 filed on Jan. 22, 2022, the entire content of which is incorporated by reference for all purposes as if fully set forth herein.

FIELD OF EMBODIMENTS

Embodiments of the invention relate generally to mass data storage, and particularly to a hard disk drive disk cartridge data storage library.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

There is an increasing need for archival data storage. Magnetic tape is a traditional solution for data back-up, but is notably slow in accessing the stored data. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time. Tape libraries are known to have a high TCO (total cost of ownership), including costly stringent environmental conditions such as regarding humidity, temperature, and the like, which may even drive the need for a separate datacenter. Still further, tape datacenter power requirements may be considered excessive.

With respect to reducing the overall cost per byte ($/Tb) of magnetic disk-based storage systems, increasing the number of disks per system is one way in which to further the $/Tb cost reduction goal. Hence, a vast magnetic disk "library" containing a significantly large number of magnetic recording disks is considered an ultimate low-cost solution to the challenges associated with archival data storage both now and into the future, and would demonstrate a faster "time to first byte" than tape (e.g., no tape winding needed) and a faster data rate than with optical disks.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 7 is a flow diagram illustrating a method of transferring a magnetic recording disk medium, according to an embodiment.

DETAILED DESCRIPTION

Figure 1:
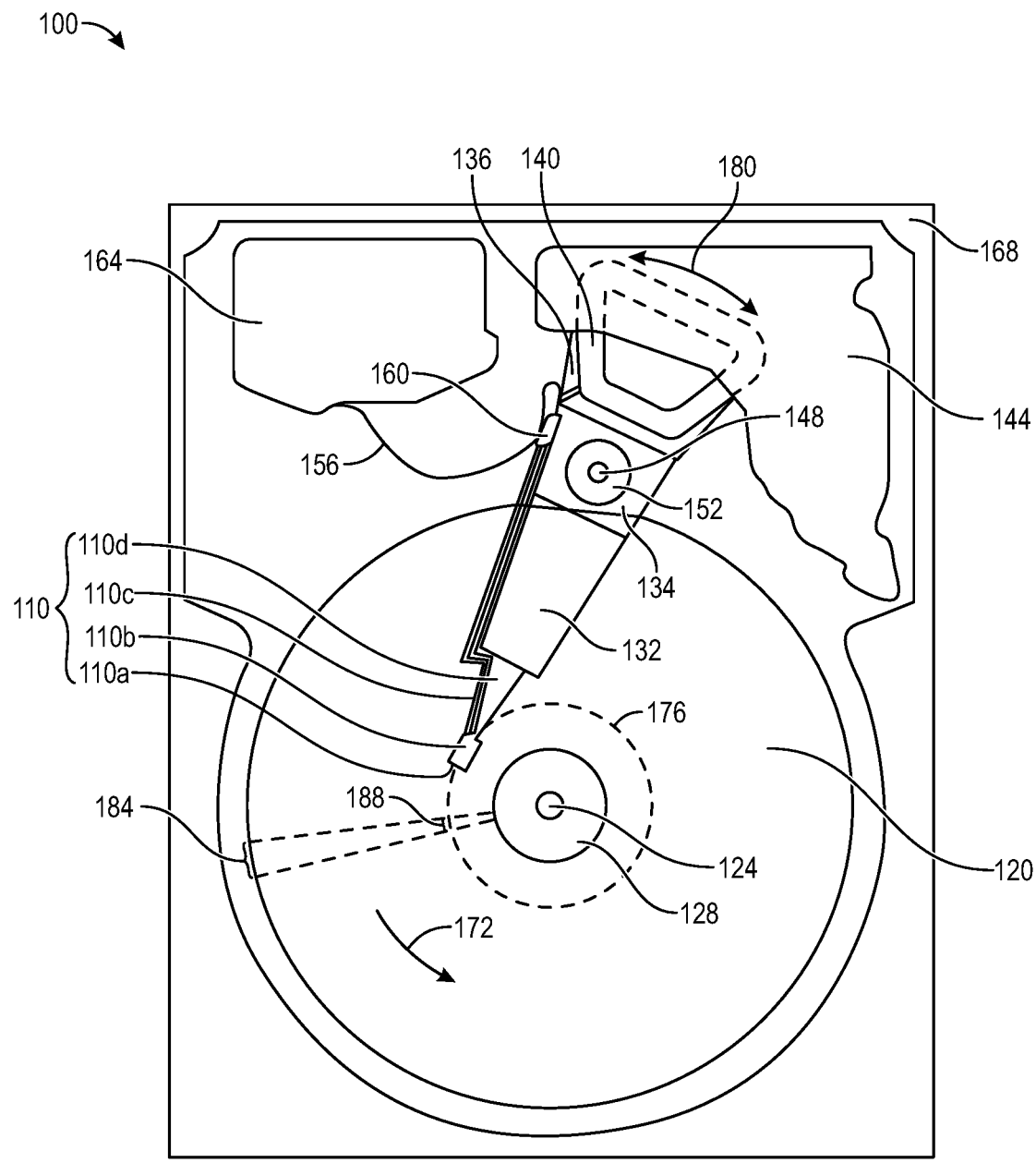
FIG. 1 is a plan view illustrating a hard disk drive (HDD), according to an embodiment.

Generally, approaches to a mass data storage library utilizing disk cartridges housing disk media are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that a vast magnetic disk "library" containing a significantly large number of magnetic recording disks is considered an ultimate low-cost solution to the challenges associated with archival data storage. Usage patterns of such a disk library are envisioned as similar to a tape library, including primarily sequential write operations with no standard block size (from the host perspective) along with occasional (low duty cycle) large, largely sequential, library-wide read operations. As such, random seeks are not common and enterprise-grade performance is not of primary concern. Thus, the command interface to the library and specifically to the media drives (as exposed to the host) in the library need not rely on a standard HDD command set, but rather may mimic and therefore be more compatible with the streaming commands used by tape drives in tape libraries. It follows that the capacity requirement and operational functionality of such modified drives are less strict than with a conventional HDD, which could provide more design freedom resulting in cost and reliability benefits, for example. Such an "archival interface" favors sequential writes, variable media capacity, and more efficient disk defect handling, for non-limiting examples.

In view of the foregoing, front-loaded head wear would be expected in view of the large writes to first populate the library, especially if write-verify operations are employed such as in the context of shingled magnetic recording (SMR), in which the data tracks are written to disk sequentially in a partially overlapping manner similar to shingles on a roof. Hence, head replacement capability is desirable (i.e., swapping out drives), as well as general flexibility with respect to inserting new media (and possibly moving media among compatible libraries), adding more drives, reconfiguring robotics, and the like, such as in response to changing workloads.

Data may be striped on the upper and lower surfaces of the disk media and two independent heads may alternate between write and verify, where the write verify operation is built into the functionality of the library. As such, verify is performed on data after adjacent tracks have been written, to account for the signal degradation caused by SMR recording (e.g., the drive will rewrite downstream any data chunks that fall below a specified quality threshold, such as due to a defect of the disk media which may be indicated by degradation of the signal-to-noise (SNR) ratio), and this write verify increases data reliability and lifetime in an archival data storage system by guaranteeing a minimum data recording quality. This is enabled at least in part by use of the inherent caching available in disk drives, in contrast with tape drives, such that the verify operation can wait for adjacent tracks to be written and are more stable at that point, thus leading to higher data reliability. This operational behavior may also reduce media cost by eliminating the need to scan for media defects in the factory.

A disk cartridge library system is considered scalable, for example, in that the number of media, drives, and robots, i.e., the constituent components, are all readily scalable. Further, the capacity is expandable, such as by adding additional columns of cartridge storage bays to the system. The library is serviceable, for example, in that cartridges that may become dirty can be readily removed and new cartridges are easily added to the system. Also, the library can be readily shipped, built, and upgraded in a modular manner as constituent components and modules can be packaged, transported, maintained separately and independently. The library is reliable in that there is no single point of failure, as the blast radius due to a failure is effectively limited to a single medium, drive or robot, which are each readily replaceable as discussed, and therefore a failure does not extend to or encompass additional components. In the various approaches of the disk cartridge library, the conventional HDD as described in reference to FIG. 1 is modified so that the magnetic medium 120 is made removable from the rest of the HDD, and the other HDD components are modified to (1) accommodate the loading and unloading of the medium and (2) provide other functionalities needed to support the recording and retrieval of data in the library environment.

One possible approach to such a data storage library utilizing magnetic recording disk media involves use of disk cartridges housing multiple disk media for use in storing and accessing data stored thereon by a read-write device. However, such a disk cartridge library may present challenges with respect to maintaining "clean" environment(s) necessary for successful, reliable and long-standing data operations (generally, read and write operations) involving clean magnetic recording disk media, which may need to be stored and transferred around within the library in "dirty" environment(s). The term "clean" is used herein to refer generally to a typical largely sealed magnetic-recording environment utilizing read-write transducers (or "heads") "flying" within very small distances over a corresponding disk surface, such as inside a hard disk drive, by creating and maintaining a substantially and relatively low, controlled contaminant particle count, i.e., a "contaminant-controlled" environment. By contrast, a "dirty" environment refers to an environment in which a relatively high, relatively uncontrolled particle count is or may be present, i.e., a "less-contaminant-controlled" environment, including uncontrolled, relative to a clean contaminant-controlled environment.

Because modern hard disk drives (HDDs) fly the read-write head so very close to the disk surface, the presence of surface contaminants attached to either the head slider and/or the disk can cause undesirable flying height changes which increases the likelihood of head-disk contact (or "crash") and thus read-write (I/O) errors. Conventional HDDs operate in a clean environment, i.e., a sealed operating environment relatively free of contaminant particles, outgases, and the like, which is typically maintained after manufacturing by utilizing one or more internal filters. Breather and/or other HDD filters often are designed and configured to serve multiple functions, such as absorbing contaminants, adsorbing contaminants, controlling humidity, and the like.

Magnetic Disk Cartridges for Data Storage Library

A data storage library employing disk cartridges (also, "disk cartridge library") may be configured and operated such that magnetic disk media and read-write drive (or "media drive") interior/internal environments are maintained "clean" ("contaminant-controlled") while modular rack components are "dirty" ("less-contaminant-controlled" relative to clean environments). With various approaches to a disk cartridge library, magnetic disk media (e.g., "hard disks") that are typically in conventional hard disk drives are housed in disk cartridges organized in a library. Under the use of robotic automation, cartridges are retrieved and disk media are extracted from the cartridges for access by media drives for reading and writing operations. After access, media are returned to cartridges, which are returned to the library for storage.

Figure 2A:
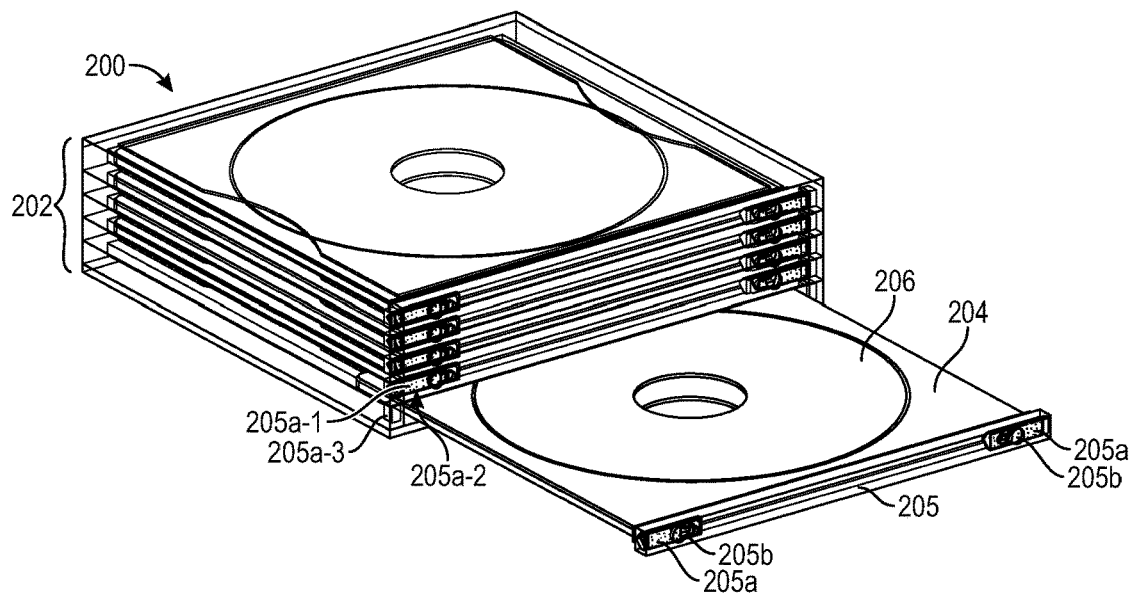
FIG. 2A is a perspective view illustrating a magnetic recording disk cartridge, according to an embodiment.

FIG. 2A is a perspective view illustrating a magnetic recording disk cartridge, according to an embodiment. Disk cartridge 200 comprises multiple internally-clean isolated compartments 202 each configured to house an internally-clean disk tray 204 configured to house a clean magnetic recording disk medium 206. Thus, each disk cartridge 200 is considered and maintained internally-clean, while being externally-dirty (i.e., outer surfaces may be dirty) so that each disk cartridge 200 can be transported around and within a larger data storage library. Similarly, each disk tray 204 is considered and maintained internally-clean because it is stored in an internally-clean compartment 202 of the disk cartridge 200, while the only surface of the disk tray 204 that may be dirty is a faceplate 205, as it faces an environment external to the disk cartridge 200. Faceplate 205 comprises a tray locking mechanism 205*a* and a pin-receiving feature 205*b*. According to an embodiment, tray locking mechanism 205*a* comprises a locking bolt 205*a*-1 or structure positioned in a slot 205*a*-2 and configured to move in the slot into and out of a corresponding locking bolt receiver 205*a*-3 ("receiver 205*a*-3"). According to an embodiment, per-disk system metadata, customer metadata, and like information may be stored in cartridge-based memory, such as onboard non-volatile flash memory.

Figure 2B:
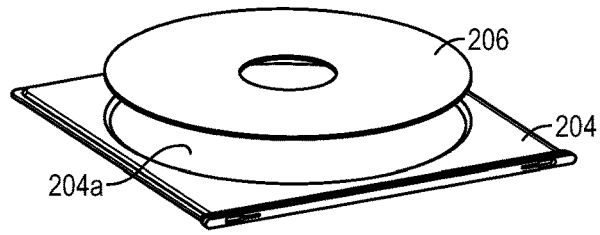
FIG. 2B is a perspective view illustrating a disk tray corresponding to the disk cartridge of FIG. 2A, according to an embodiment.

FIG. 2B is a perspective view illustrating a disk tray corresponding to the disk cartridge of FIG. 2A, according to an embodiment. Here, disk medium 206 is shown exploded from the corresponding disk tray 204, which is shown here in isolation outside of the compartment 202 (FIG. 2A) and disk cartridge 200 (FIG. 2A) structure, and shown without its faceplate 205 for clarity. Each disk tray 204 may have a circular cutout 204*a* with sloped walls which hold disk medium 206 by its outer edge while stored and during transfer between clean environments, according to an embodiment. As described in more detail elsewhere herein, each disk tray 204 along with its corresponding disk medium 206 is configured for automated extraction from a corresponding compartment 202 of a corresponding disk cartridge 200, at least in part via the pin-receiving feature 205*b* (FIG. 2A). It is contemplated that disk trays 204 are loaded, and possibly replaced or swapped out, into a compartment 202 of a disk cartridge 200 in a clean environment, such as a cleanroom. Once loaded into a clean compartment 202 of a disk cartridge 200, the disk cartridge 200 can be moved around outside of a clean environment because, as explained, the outer surfaces of the disk cartridge 200 and the faceplate 205 of each disk tray 204 can be dirty and still maintain operational capability within a disk cartridge library (generally, "data storage system") as described in more detail herein throughout. Disk cartridges 200 may be added to or removed from a disk cartridge library via designated import-export locations in a library rack.

Figure 2C:
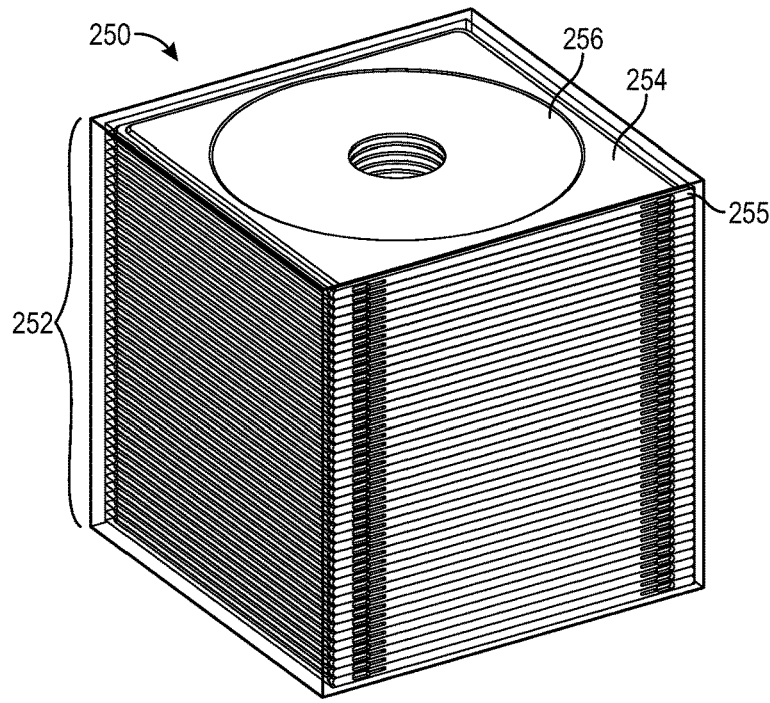
FIG. 2C is a perspective view illustrating a high-density magnetic recording disk cartridge, according to an embodiment.

FIG. 2C is a perspective view illustrating a high-density magnetic recording disk cartridge, according to an embodiment. High-density disk cartridge 250 also comprises multiple internally-clean isolated compartments 252 each configured to house an internally-clean disk tray 254 configured to house a clean magnetic recording disk medium 256. Here too, each high-density disk cartridge 250 is considered and maintained internally-clean, while being externally-dirty so that each high-density disk cartridge 250 can be transported around and within a larger data storage library. Similarly, each disk tray 254 is considered and maintained internally-clean because it is stored in an internally-clean compartment 252 of the high-density disk cartridge 250, while the only surface of the disk tray 254 that may be dirty is a faceplate 255 (e.g., configured similar to or the same as faceplate 205 of disk tray 204 of disk cartridge 200 of FIG. 2A), as it faces an environment external to the high-density disk cartridge 250.

Disk Tray Extractor Mechanism

Figure 3A:
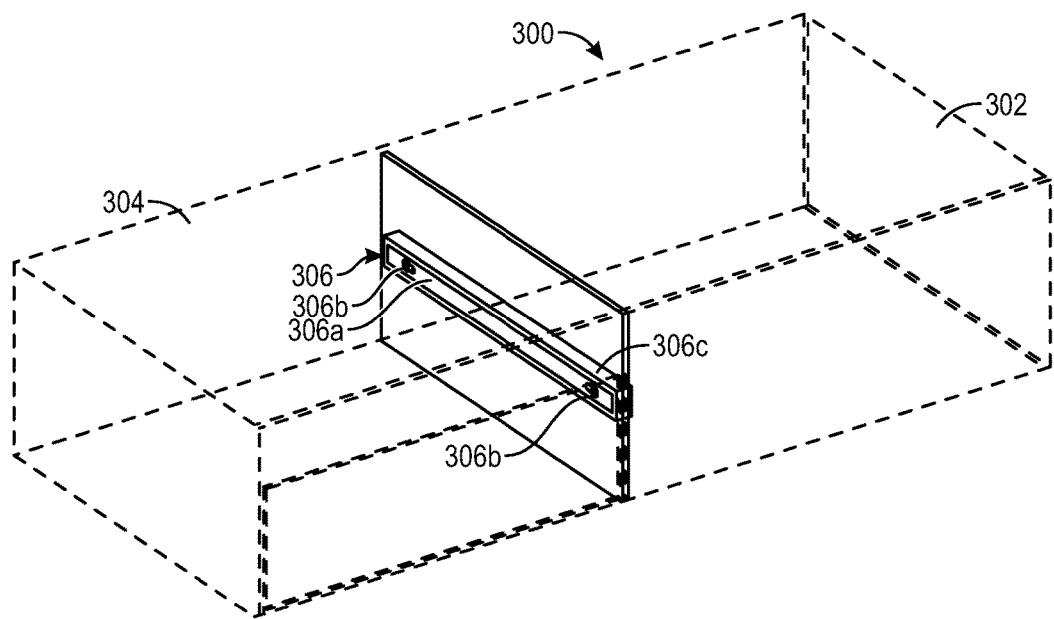
FIG. 3A is a perspective view illustrating a magnetic recording media drive with disk tray extractor mechanism, according to an embodiment.

FIG. 3A is a perspective view illustrating a magnetic recording media drive with disk tray extractor mechanism, according to an embodiment. Media drive 300 (may also be referred to as "read-write device") is configured for use in a disk cartridge library as described herein, according to an embodiment. According to an embodiment, media drive 300 comprises a drive bay 302 positioned adjacent to a disk cartridge bay 304. The illustration of FIG. 3A is simplified for clarity by foregoing the depiction of the common read-write operational components (e.g., a head slider housing the read-write transducer, an actuator, a spindle motor, etc.). However, the physical and operational description of a digital data storage device (DSD) such as a hard disk drive (HDD), or a modified version of an HDD such as may be employed in drive bay 302, is set forth in reference to FIG. 1. Media drive 300 comprises a disk tray extractor mechanism 306 ("extractor mechanism 306") at a physical interface of the drive bay 302 and the disk cartridge bay 304, and may be considered constituent to media drive 300 according to illustrated embodiment.

Extractor mechanism 306 enables transporting disk media (see, e.g., disk medium 206 of FIGS. 2A-2B) between storage and active use by "opening" the cartridge without contaminating the clean environments associated with the disk medium 206, disk tray 204 (FIGS. 2A-2B), disk cartridge 200 compartment 202 (FIGS. 2A-2B), and media drive 300. Stated otherwise, extractor mechanism 306 maintains isolation of the clean drive bay 302 from the dirty disk cartridge bay 304 of media drive 300.

Extractor mechanism 306 comprises a seal mechanism comprising a movable, translatable seal plate 306a, a set of pins 306b (e.g., "locking pins" or "alignment pins") configured to extend through the seal plate 306a and to move in a certain direction while extended through the seal plate 306a, and a shroud 306c surrounding seal plate 306a. To remove a disk tray 204, the extractor mechanism 306 transitions through a sequence of positions described in reference to FIGS. 3B-3E.

Figure 3B:
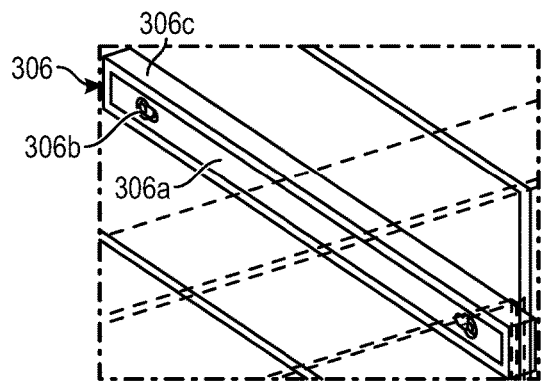
FIG. 3B is a perspective view illustrating an idle position for the extractor mechanism of the media drive of FIG. 3A, according to an embodiment.

FIG. 3B is a perspective view illustrating an idle position for the extractor mechanism of the media drive of FIG. 3A, according to an embodiment. The illustrated idle position for extractor mechanism 306 shows the seal plate 306a flush with shroud 306c, with the pins 306b in a recessed position.

Figure 3C:
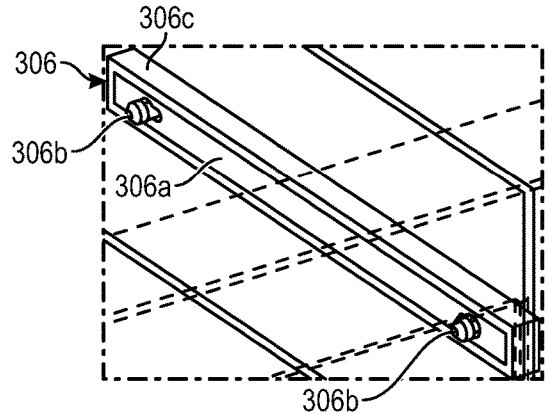
FIG. 3C is a perspective view illustrating an engaged position for the extractor mechanism of the media drive of FIG. 3A, according to an embodiment.

FIG. 3C is a perspective view illustrating an engaged position for the extractor mechanism of the media drive of FIG. 3A, according to an embodiment. The illustrated engaged position for extractor mechanism 306 now shows the pins 306b in an extended position, whereby seal plate 306a would be aligned with a disk tray (see, e.g., disk tray 204).

Figure 3D:
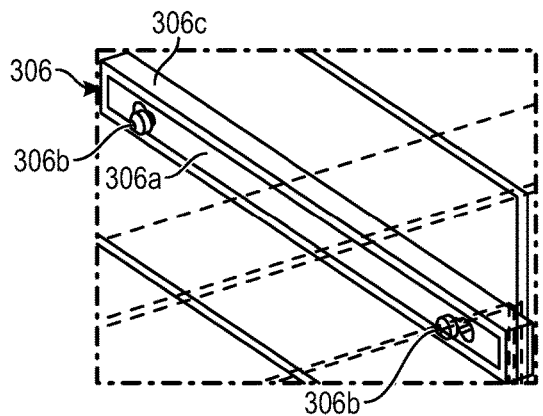
FIG. 3D is a perspective view illustrating a locked position for the extractor mechanism of the media drive of FIG. 3A, according to an embodiment.

FIG. 3D is a perspective view illustrating a locked position for the extractor mechanism of the media drive of FIG. 3A, according to an embodiment. The illustrated locked position for extractor mechanism 306 now shows the pins 306b in a moved and locked position, depicted here as shifted inward, thereby unlocking the tray locking mechanism 205a (FIG. 2A). Tray locking mechanism 205a is unlocked by sliding locking bolt 205a-1 (FIG. 2A) within the slot 205a-2 (FIG. 2A) and out of the receiver 205a-3 (FIG. 2A).

Figure 3E:
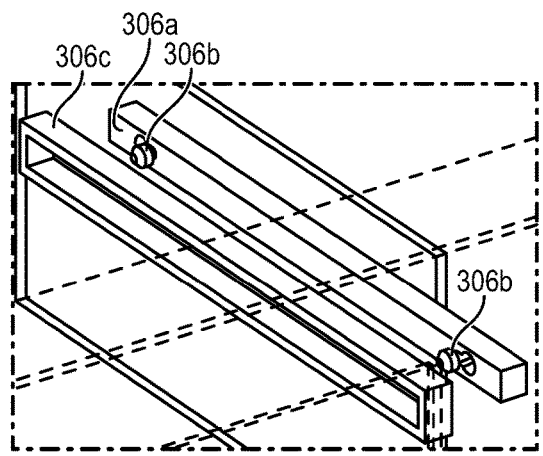
FIG. 3E is a perspective view illustrating an extracting position for the extractor mechanism of the media drive of FIG. 3A, according to an embodiment.

FIG. 3E is a perspective view illustrating an extracting position for the extractor mechanism of the media drive of FIG. 3A, according to an embodiment. The illustrated extracting position for extractor mechanism 306 now shows the pins 306b and seal plate 306a recessing into the clean internal area of media drive 300. It is noteworthy that the seal plate 306a covers the faceplate 205 (FIG. 2A) of disk tray 204, thereby physically, structurally, mechanically isolating the dirty faceplate 205 from the clean internal portion of the disk tray 204 and the other clean areas. Shown here also is that the shroud 306c covers the adjacent cartridge surfaces when the disk tray 204 is extracting/extracted. While different components, environments, spaces, etc. may be referred to herein as either "clean" or "dirty", embodiments do not absolutely require that those referred to as "dirty" are necessarily contaminant-uncontrolled, as described embodiments can be implemented to maintain and control the level of contamination of disk media and read-write device(s) for successful, reliable, available data read-write operations.

Disk Tray Extracting Sequence

Figure 4A:
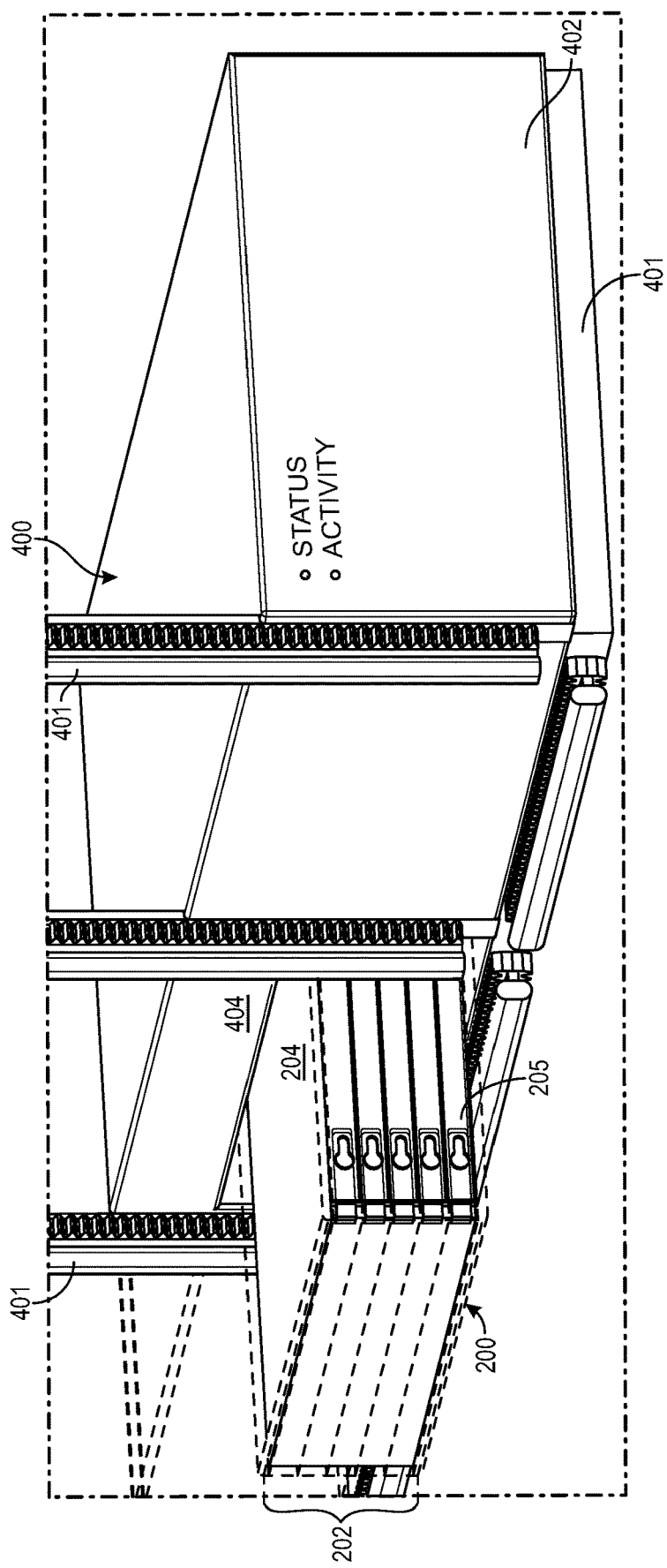
FIG. 4A is a perspective view illustrating a magnetic recording media drive with disk tray extractor, according to an embodiment.
Figure 4B:
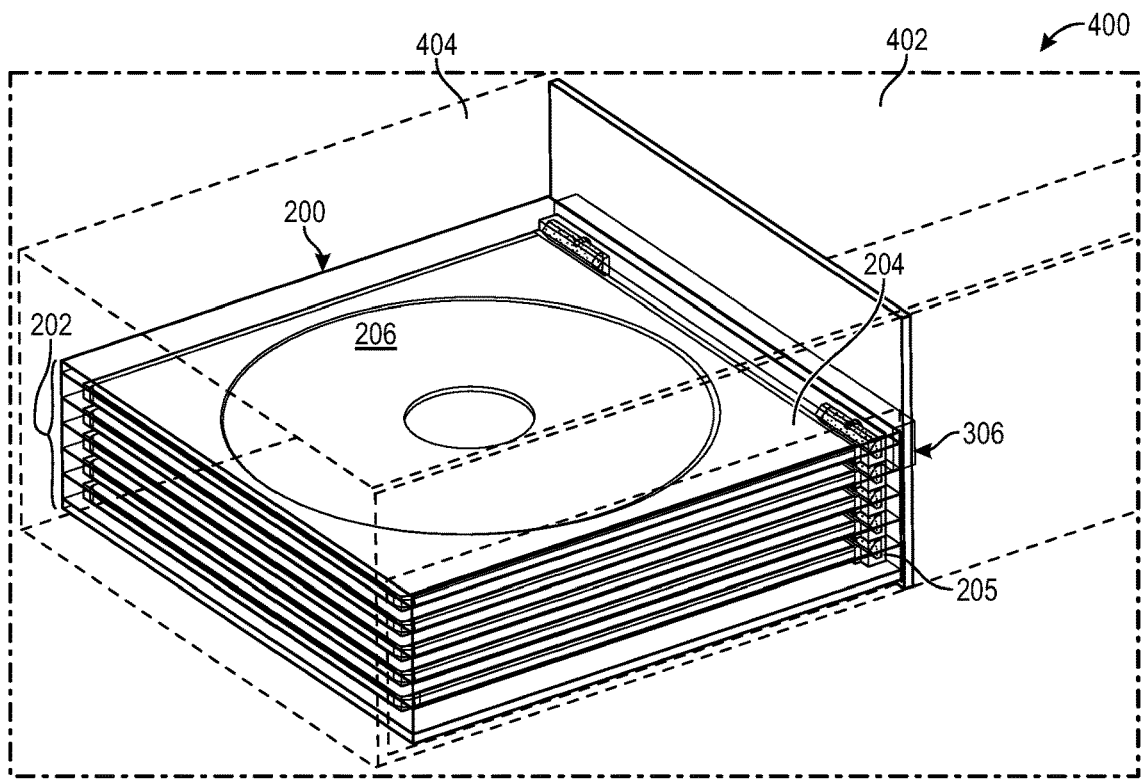
FIG. 4B is a perspective view illustrating the media drive of FIG. 4A with inserted disk cartridge, according to an embodiment.

FIGS. 4A-4I represent an automated disk tray extracting sequence, whereby a disk tray is extracted from a disk cartridge into a media drive/media drive bay by the media drive itself. FIG. 4A is a perspective view illustrating a magnetic recording media drive with disk tray extractor, according to an embodiment. Like media drive 300 (FIG. 3A), media drive 400 depicted here comprises a media drive bay 402 positioned adjacent to a disk cartridge bay 404. While media drive 400 may populate two bays of a modular storage library rack 401, media drive 400 may be configured as an integral/integrated component including both the media drive bay 402 (which may itself be referred to as a "media drive 402") and the disk cartridge bay 404. FIG. 4A further depicts a disk cartridge 200 partially loaded into the disk cartridge bay 404. According to an embodiment, a robotic machine of the disk cartridge library inserts the disk cartridge 200 into the disk cartridge bay 404 of media drive 400. FIG. 4B is a perspective view illustrating the media drive of FIG. 4A with inserted disk cartridge, according to an embodiment. Thus, depicted here is disk cartridge 200 fully inserted and housed in the disk cartridge bay 404 of media drive 400, with the faceplate 205 side of each disk tray 204 facing the extractor mechanism 306 (FIGS. 3A-3D) of media drive bay 402 of media drive 400. Here, as with FIG. 2A, disk cartridge 200 is depicted with an arbitrary number of five compartments 202 each housing a corresponding disk tray 204.

Figure 4C:
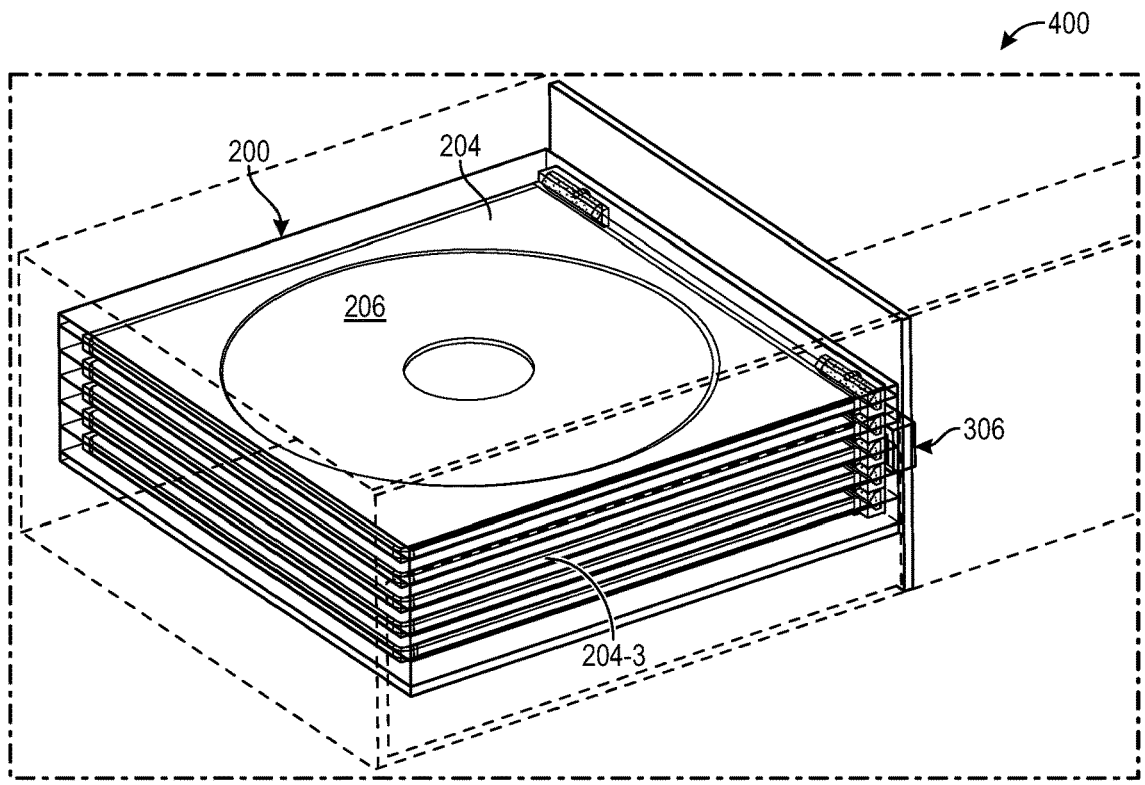
FIG. 4C is a perspective view illustrating the media drive of FIG. 4A with aligned seal mechanism, according to an embodiment.
Figure 4D:
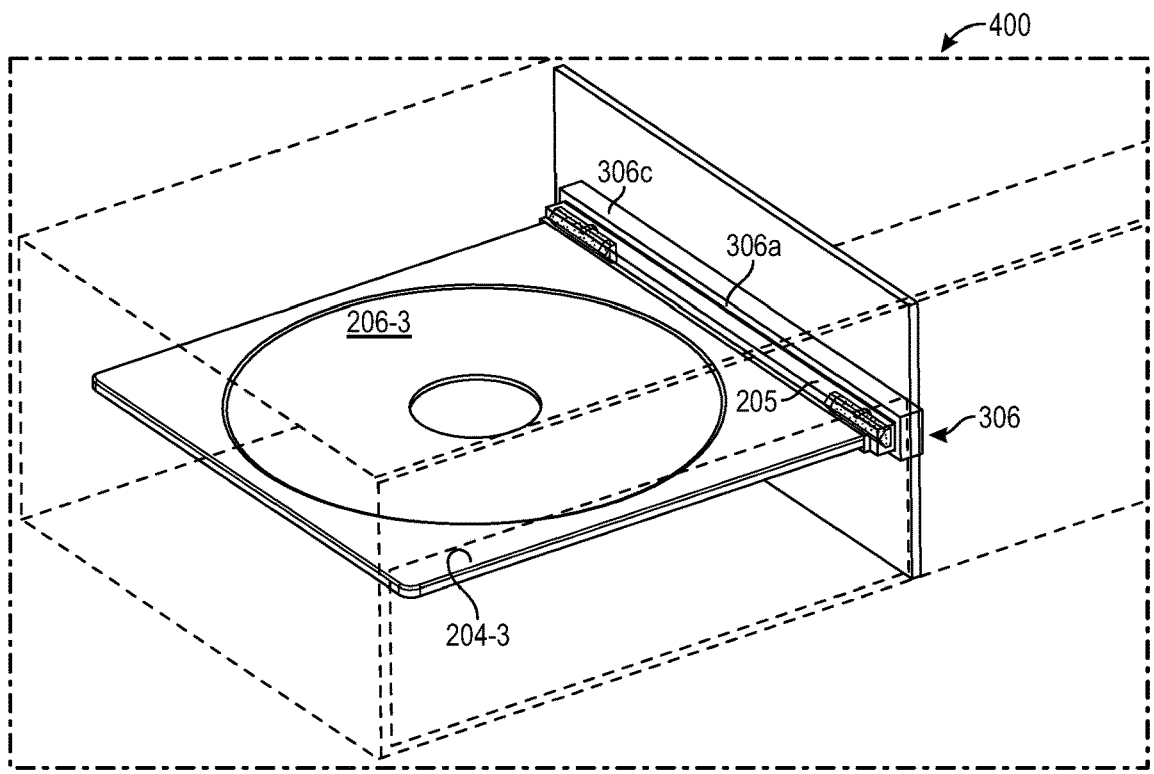
FIG. 4D is a perspective view illustrating the media drive of FIG. 4A with idle tray extractor, according to an embodiment.

FIG. 4C is a perspective view illustrating the media drive of FIG. 4A with aligned seal mechanism, according to an embodiment. According to an embodiment, media drive 400 is configured to raise disk cartridge 200 to precisely align seal plate 306a with the faceplate 205 of a requested disk tray 204-3 (e.g., the third tray in this example). FIG. 4D is a perspective view illustrating the media drive of FIG. 4A with idle tray extractor, according to an embodiment. Here, the disk cartridge 200 and the other disk trays 204 other than disk tray 204-3 are omitted for clarity. FIG. 4D depicts the particular disk tray 204-3 now aligned to an idle disk tray extractor mechanism 306 (see also FIG. 3B).

Figure 4E:
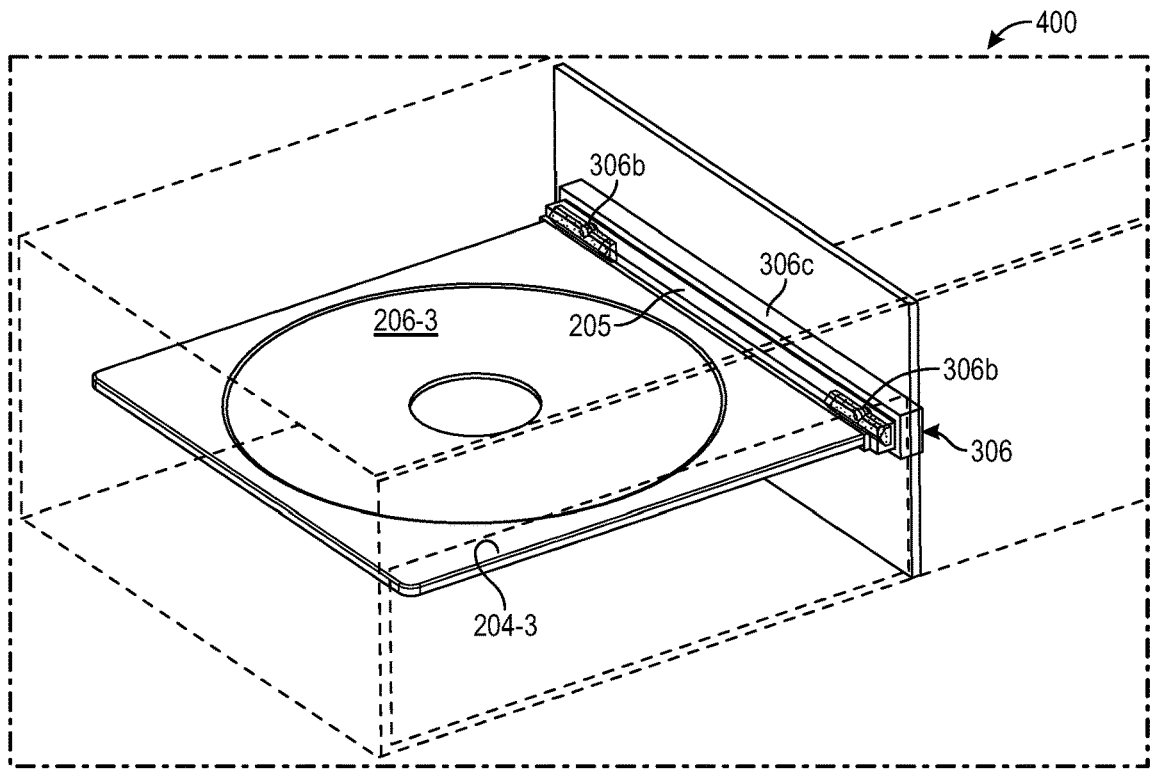
FIG. 4E is a perspective view illustrating the media drive of FIG. 4A with locking pins engaged, according to an embodiment.
Figure 4F:
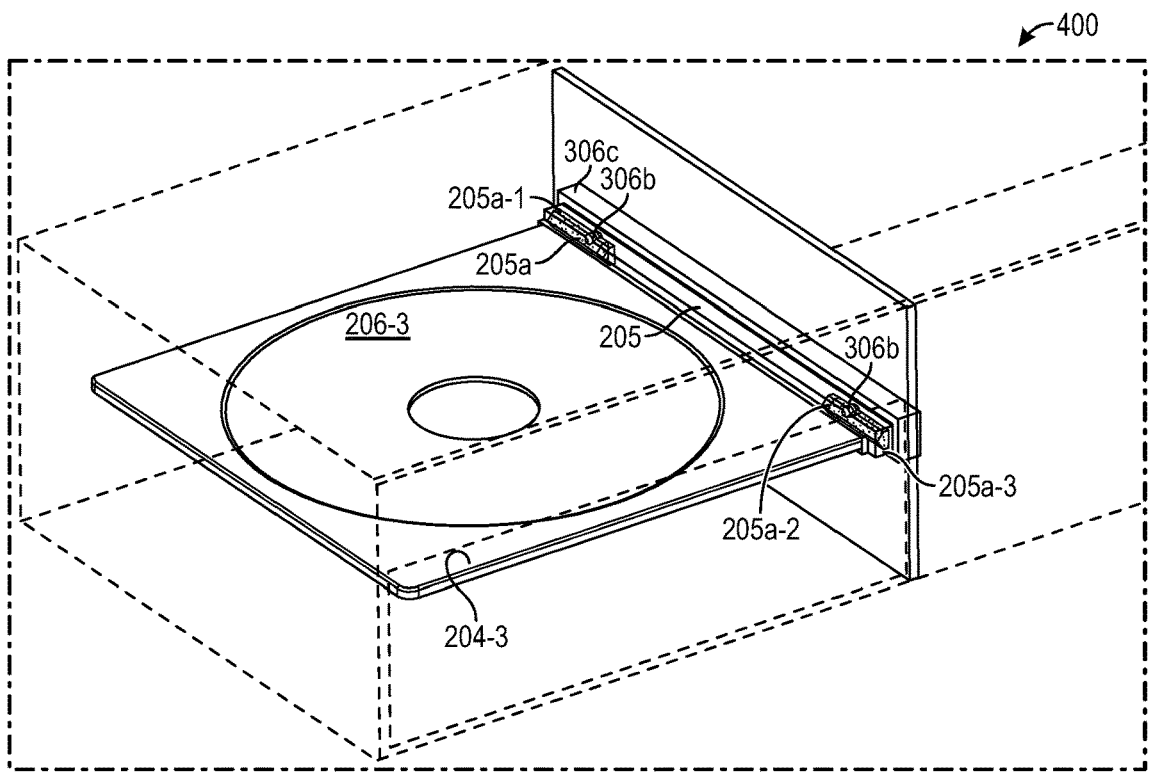
FIG. 4F is a perspective view illustrating the media drive of FIG. 4A with locking pins locked, according to an embodiment.

FIG. 4E is a perspective view illustrating the media drive of FIG. 4A with locking pins engaged, according to an embodiment. Here, extractor mechanism 306 has now engaged the disk tray 204-3 by extending pins 306b through the faceplate 205 (see also FIG. 2A) and the pin-receiving feature 205b (FIG. 2A) of disk tray 204-3 (see also FIG. 3C). FIG. 4F is a perspective view illustrating the media drive of FIG. 4A with locking pins locked, according to an embodiment. Here, pins 306b are shifted (for a non-limiting example, moved inward) to secure/hold the disk tray 204-3 and to unlock the disk tray 204-3 from the disk cartridge 200 (FIG. 4B). As described in reference to FIG. 3D, disk tray 204-3 is unlocked from disk cartridge 200 via tray locking mechanism 205a by sliding locking bolt 205a-1 (FIG. 2A) within the slot 205a-2 (FIG. 2A) and out of the receiver 205a-3 (FIG. 2A).

Figure 4G:
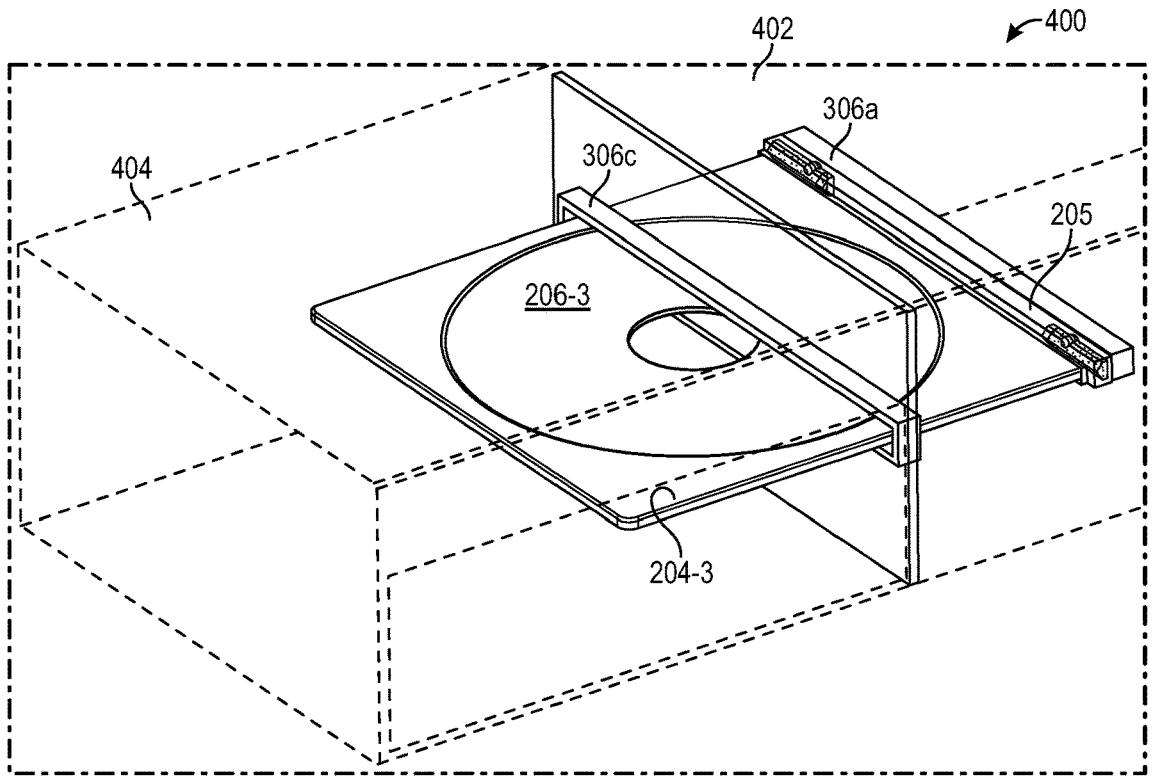
FIG. 4G is a perspective view illustrating the media drive of FIG. 4A with tray being extracted, according to an embodiment.
Figure 4H:
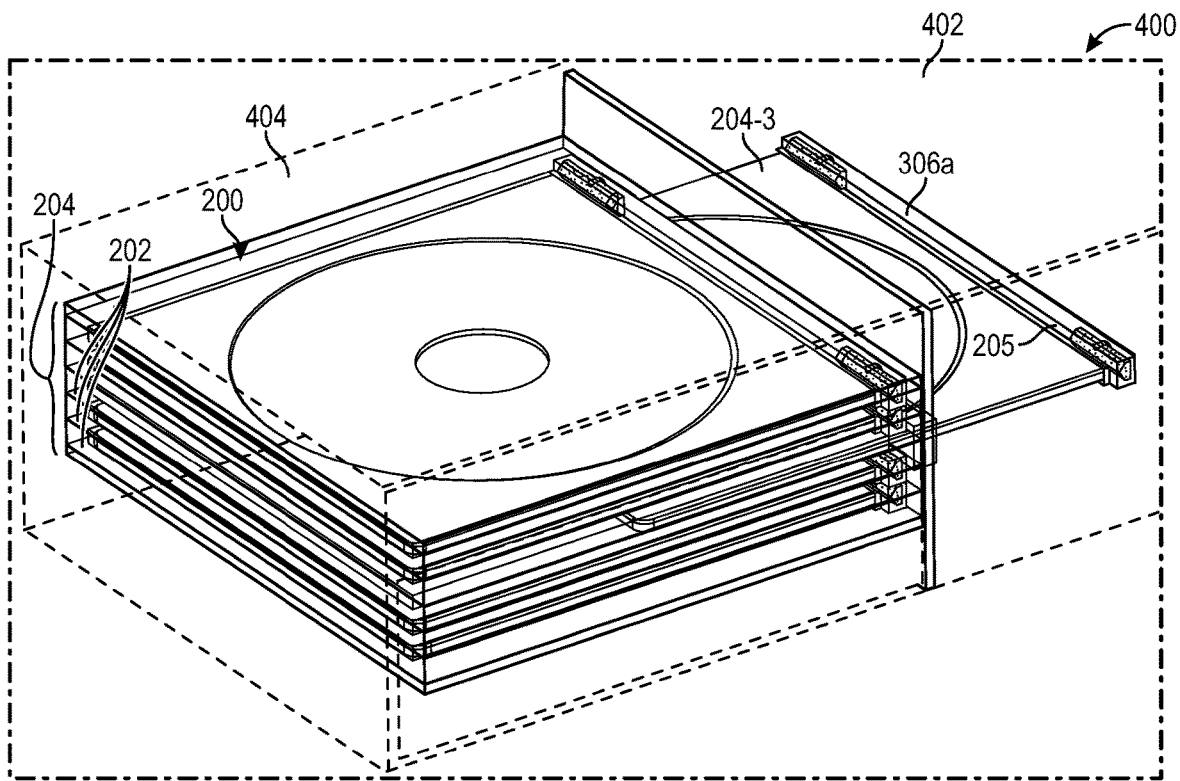
FIG. 4H is a perspective view illustrating the media drive of FIG. 4A with tray being extracted, according to an embodiment.

FIG. 4G is a perspective view illustrating the media drive of FIG. 4A with tray being extracted, according to an embodiment. Here, disk tray 204-3 is shown being pulled by the media drive 400 from the dirty disk cartridge bay 404 into the clean media drive bay 402, through the shroud 306c with the seal plate 306a attached to and covering the faceplate 205 of disk tray 204-3. FIG. 4H is a perspective view illustrating the media drive of FIG. 4A with tray being extracted, according to an embodiment. Here, the disk cartridge 200 and the other disk trays 204 other than disk tray 204-3 are now shown, thus depicting the clean disk tray 204-3 "merging" with the clean environment of the media drive bay 402 while the other disk trays 204 remain isolated in their respective internally-clean compartment 202 (see also FIG. 3B). Here again the seal plate 306a covers the faceplate 205 of disk tray 204-3, thereby physically, structurally, mechanically isolating the dirty faceplate 205 from the clean portion of the disk tray 204 and the other clean areas.

Figure 4I:
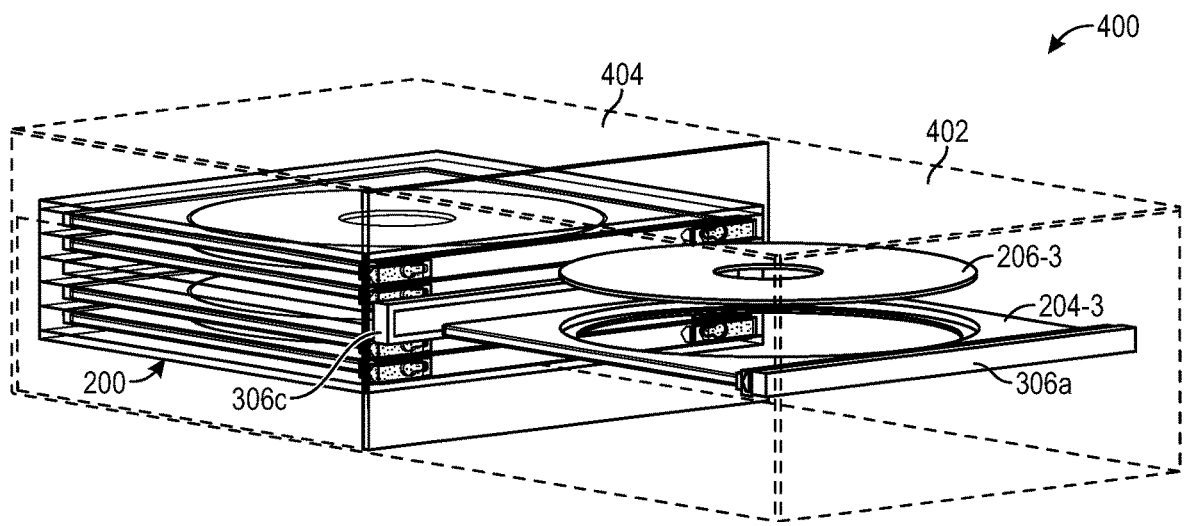
FIG. 4I is a perspective view illustrating the media drive of FIG. 4A with tray extracted and inside media drive, according to an embodiment.

FIG. 4I is a perspective view illustrating the media drive of FIG. 4A with tray extracted and inside media drive, according to an embodiment. Once the disk tray 204-3 is fully inside the media drive bay 402, media drive 400 mounts the disk medium 206-3 onto a spindle (not shown here; see, e.g., spindle 124 of FIG. 1) and raises the disk medium 206-3 above the level of the disk tray 204-3 where it can be spun up and accessed. While different components, environments, spaces, etc. may be referred to herein as either "clean" or "dirty", embodiments do not absolutely require that those referred to as "dirty" are necessarily contaminant-uncontrolled, as described embodiments can be implemented to maintain and control the level of contamination of transportable and mountable/removable disk media and read-write device(s) for successful, reliable, available data read-write operations, regardless of the degree of cleanliness or dirtiness of other components, environments, spaces, etc.

High-Density Cartridge Arrangement

Figure 5:
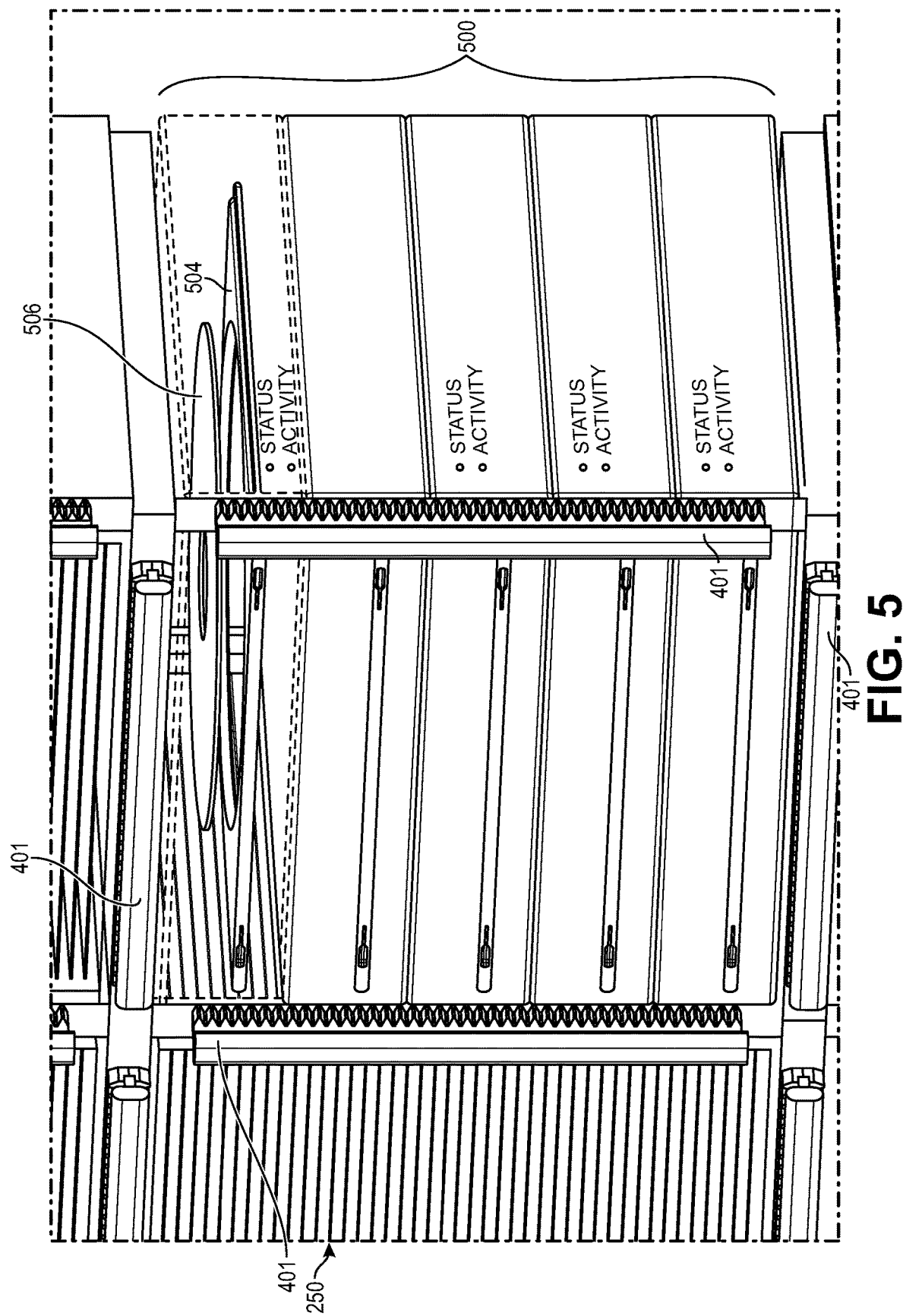
FIG. 5 is a perspective view illustrating a high-density magnetic recording disk cartridge and media drive system, according to an embodiment.

FIG. 5 is a perspective view illustrating a high-density magnetic recording disk cartridge and media drive system, according to an embodiment. High-density disk cartridge 250 ("HD disk cartridge 250") was introduced in reference to FIG. 2C, and comprises a larger number of internally-clean isolated compartments 252 (FIG. 2C) than does disk cartridge 200 of FIG. 2A, each for housing a disk tray 254 (FIG. 2C) for housing a magnetic recording disk medium 256 (FIG. 2C). Consequently, multiple media drives 500 can be employed in a given drive bay of a library rack 401 (arbitrarily, space for five shown here with one depicted largely in phantom).

Figure 6:
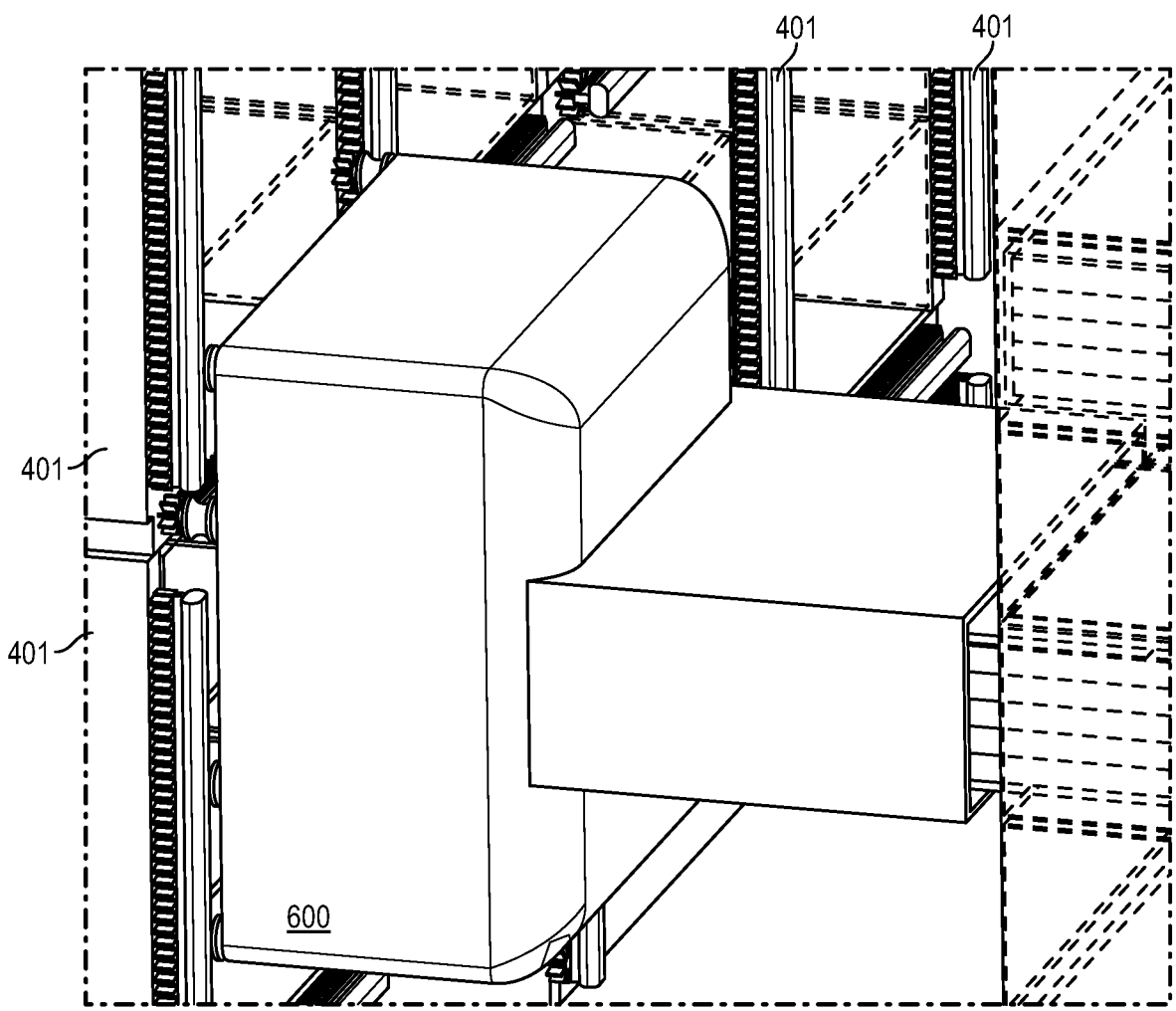
FIG. 6 is a perspective view illustrating a media robot for a disk cartridge library, according to an embodiment.

FIG. 6 is a perspective view illustrating a media robot for a disk cartridge library, according to an embodiment. Implementation and use of a HD cartridge 250 is at least in part enabled by the implementation and use of an internally-clean robotic machine 600 for extracting from HD cartridge 250 (FIGS. 2C, 5) and loading disk trays 504 (FIG. 5), or disk media 506 (FIG. 5) directly, into a media drive 500 (FIG. 5). According to an embodiment, robotic machine 600 comprises a disk transfer mechanism similar to or the same as disk tray extractor mechanism 306 (see, e.g., FIGS. 3A-3E, 4B-4H). Therefore and according to an embodiment, robotic machine 600 is configured to extract a disk tray 204 (FIGS. 2A-2C) from a compartment 252 (FIG. 2C) or slot of HD cartridge 250 into a clean compartment of robotic machine 600 utilizing extractor mechanism 306, remove the disk medium 206 (FIGS. 2A-2B) from the disk tray 204, insert the disk medium 206 into a media drive 500, and reinsert the disk tray 204 into HD cartridge 250 to restore the clean seal of internally-clean HD cartridge 250. Alternatively and according to an embodiment, robotic machine 600 is configured to extract a disk tray 204 (FIGS. 2A-2C) from HD cartridge 250 and insert the entire disk tray 204 with disk medium 206 into a media drive 500, and cover the empty compartment of HD cartridge 250 to restore the clean seal to internally-clean HD cartridge 250 in the case in which the robotic machine 600 has to move to another bay of rack 401 while the disk tray 204 is still extracted from HD cartridge 250.

In any case, each HD cartridge 250 may remain in place indefinitely in a cartridge bay 504 (FIG. 5) adjacent to the bank of media drives 500 (FIG. 5) and does not necessarily need to be returned to a library storage bay as often, if at all. Furthermore, HD cartridge 250 can be larger and of larger capacity (more disk media) than disk cartridge 200 (FIGS. 2A-2B) because it is not inserted into the cartridge bay 304, 404 of media drive 300, 400, where vertical clearance is needed to align a particular disk tray 204 with the extractor mechanism 306 of media drive 300, 400 (thus cartridge height is less constrained and media drive dimensions not limited by cartridge size). Still further, multiple disk media 206 from a given disk cartridge 250 may be in place and in use in a corresponding media drive 500 at any given time.

Method of Transferring a Magnetic Recording Disk Medium

FIG. 7 is a flow diagram illustrating a method of transferring a magnetic recording disk medium, according to an embodiment.

At block 702, a media drive having a clean internal environment extends a set of locking pins through a dirty faceplate of an internally-clean disk tray housed in an externally-dirty disk cartridge and supporting a clean magnetic recording disk medium, including covering the dirty faceplate with a seal plate, through which the set of locking pins extend, to physically isolate the dirty faceplate from the clean internal portion of the disk tray and corresponding compartment and the clean internal environment of the media drive. For example, media drive 300, 400 (FIGS. 3A, 4A) having a clean, contaminant-controlled internal environment extends a set of locking pins 306b (FIGS. 3a-3E, 4E-4F) through a dirty, less-contaminant-controlled faceplate 205 (see, e.g., FIGS. 2A, 4A, 4D) of an internally-clean contaminant-controlled disk tray 204-3 (FIGS. 4C-4I) housed in an externally-dirty less-contaminant-controlled disk cartridge 200 (FIGS. 2A, 4A-C, 4H-4I), and supporting a clean contaminant-controlled magnetic recording disk medium 206 (FIGS. 2A-2B), 206-3 (FIGS. 4D-4G), 256 (FIG. 2C), including covering the dirty faceplate 205 with a seal plate 306a (FIGS. 3A-3E, 4G-4H), through which the set of locking pins 306b (FIGS. 3A-3E, 4E-4F) extend, to physically isolate the dirty faceplate 205 from the clean contaminant-controlled internal portion of the disk tray 204-3 and corresponding contaminant-controlled compartment 202 (FIGS. 2A, 4A-4B, 4H) and the clean contaminant-controlled internal environment of the media drive 300, 400. In the case of HD cartridge 250, according to an embodiment the robotic machine 600 (FIG. 6) extends locking pins 306b through the faceplate 255 (FIG. 2C) of the disk tray 254 (FIG. 2C) housed in the HD disk cartridge 250 (FIGS. 2C, 5).

At block 704, the media drive moves the set of locking pins to unlock the disk tray from the disk cartridge and to hold the disk tray. For example, media drive 300, 400 moves the set of locking pins 306b inward to unlock the disk tray 204-3 from the disk cartridge 200, 250 and to hold the disk tray 204-3. In the case of HD cartridge 250, according to an embodiment the robotic machine 600 moves the set of locking pins 306b inward to unlock the disk tray 254 from the HD disk cartridge 250 and to hold the disk tray 254.

At block 706, the media drive pulls the disk tray with the disk medium from the disk cartridge completely into the clean internal environment of the media drive through a shroud covering disk cartridge surfaces around the dirty faceplate. For example, media drive 300, 400 pulls the disk tray 204-3 with the disk medium 206 from the disk cartridge 200, 250 completely into the clean contaminant-controlled internal environment of the media drive 300, 400 through a shroud 306c (FIGS. 3A-3E, 4D-4G) covering disk cartridge 200, 250 surfaces around the dirty less-contaminant-controlled faceplate 205. According to an embodiment, pulling the disk tray 204-3 from the disk cartridge 200, 250 includes pulling the seal plate 306a covering the faceplate 205 of the disk tray 204-3. In the case of HD cartridge 250, according to an embodiment the robotic machine 600 pulls the disk tray 254 with the disk medium 256 (FIG. 2C) from the HD disk cartridge 250, completely into the clean internal environment of the robotic machine 600 through a shroud 306c covering HD disk cartridge 250 surfaces around the dirty faceplate 255. Here further, the robotic machine 600 may insert the disk medium 256 into media drive 500 for one or more data operations.

Physical Description of Illustrative Operating Context(s)

Embodiments may be implemented to use digital data storage devices (DSDs) such as hard disk drive (HDDs). Thus, in accordance with an embodiment, a plan view illustrating a conventional HDD 100 is shown in FIG. 1 to aid in describing how a conventional HDD typically operates, keeping in mind the modifications described herein.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128. According to embodiments described herein, disk media are not permanently affixed to a spindle (such as spindle 124) but are inserted into a read-write device where they can be temporarily/removably mounted onto a spindle and held thereon for facilitating read/write operations.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system comprising:
a media drive configured for writing to and reading from magnetic recording disk media and configured for having a contaminant-controlled internal environment, the media drive comprising:
a disk tray extractor mechanism positioned within the media drive, the extractor mechanism comprising:
a seal mechanism comprising a translatable seal plate configured at times flush with a surrounding shroud, and
a set of pins configured to extend through the seal plate and to move in a direction while extended through the seal plate;
a disk cartridge bay positioned adjacent to the media drive; and
a disk cartridge, positioned in the disk cartridge bay, comprising a plurality of contaminant-controlled compartments each configured for housing a corresponding internally contaminant-controlled disk tray each configured to support a magnetic recording disk medium.

2. The data storage system of claim 1, wherein:
the seal plate is configured to cover a faceplate of each of the plurality of disk trays to physically isolate the faceplate from a contaminant-controlled portion of the internally contaminant-controlled disk tray, the corresponding contaminant-controlled compartment, and the contaminant-controlled internal environment of the media drive.

3. The data storage system of claim 2, wherein:
the shroud is configured to cover surfaces of the disk cartridge adjacent to the faceplate.

4. The data storage system of claim 1, wherein the set of pins is further configured to:
extend through a faceplate of each of the plurality of disk trays to hold a corresponding disk tray; and
move in the direction to unlock the corresponding disk tray from the disk cartridge.

5. The data storage system of claim 1, wherein the media drive and the disk cartridge bay are configured as an integrated component.

6. A data storage system comprising:
a plurality of media drives in a single drive bay, each media drive configured for writing to and reading from magnetic recording disk media and configured for having a contaminant-controlled internal environment;
a disk cartridge bay positioned adjacent to the drive bay; and
a disk cartridge, positioned in the disk cartridge bay, comprising a plurality of contaminant-controlled compartments each configured for housing a corresponding internally contaminant-controlled disk tray each configured to support a magnetic recording disk medium; and
an internal contaminant-controlled robotic machine comprising a disk transfer mechanism comprising:
a seal mechanism comprising a translatable seal plate configured at times flush with a surrounding shroud, and
a set of pins configured to extend through the seal plate and to move in a direction while extended through the seal plate.

7. The data storage system of claim 6, wherein the disk transfer mechanism is configured to:
remove a disk tray from a corresponding compartment of the disk cartridge;
remove a disk medium from the removed disk tray; and reinsert the empty disk tray back into the corresponding compartment.

8. The data storage system of claim 7, wherein the disk transfer mechanism is further configured to:
insert the disk medium into one of the media drives.

9. The data storage system of claim 6, wherein the disk transfer mechanism is configured to:
remove a disk tray supporting a disk medium from a corresponding compartment of the disk cartridge;
insert the disk tray with the disk medium into one of the media drives; and
cover the empty compartment of the disk cartridge.

* * * * *